United States Patent
Schmit et al.

(10) Patent No.: US 10,321,052 B2
(45) Date of Patent: Jun. 11, 2019

(54) METHOD AND APPARATUS OF SEAM FINDING

(71) Applicant: Advanced Micro Devices, Inc., Sunnyvale, CA (US)

(72) Inventors: Michael L. Schmit, Sunnyvale, CA (US); Radhakrishna Giduthuri, Sunnyvale, CA (US); Kiriti Nagesh Gowda, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 98 days.

(21) Appl. No.: 15/582,460

(22) Filed: Apr. 28, 2017

(65) Prior Publication Data

US 2018/0316851 A1  Nov. 1, 2018

(51) Int. Cl.
*H04N 5/232* (2006.01)
*H04N 5/247* (2006.01)

(52) U.S. Cl.
CPC ..... *H04N 5/23222* (2013.01); *H04N 5/23238* (2013.01); *H04N 5/23251* (2013.01); *H04N 5/247* (2013.01)

(58) Field of Classification Search
CPC ........... H04N 5/23222; H04N 5/23251; H04N 5/23238; H04N 5/247
See application file for complete search history.

(56) References Cited

U.S. PATENT DOCUMENTS

| | | | |
|---|---|---|---|
| 2013/0329002 A1* | 12/2013 | Tico | G06T 3/4038 348/36 |
| 2013/0329071 A1* | 12/2013 | Doepke | H04N 5/23258 348/222.1 |
| 2014/0362173 A1* | 12/2014 | Doepke | H04N 5/23238 348/36 |
| 2016/0063705 A1* | 3/2016 | Xu | G06T 5/50 382/199 |
| 2017/0178372 A1* | 6/2017 | Gormish | G06T 11/60 |
| 2018/0191954 A1* | 7/2018 | Pan | H04N 5/23238 |

\* cited by examiner

*Primary Examiner* — Timothy J Henn

(74) *Attorney, Agent, or Firm* — Volpe and Koenig, P.C.

(57) ABSTRACT

A method and apparatus of seam finding includes determining an overlap area between a first image and a second image. The first image is captured by a first image capturing device and the second image is captured by a second image capturing device. A plurality of seam paths for stitching the first image with the second image is computed and a cost is computed for each seam path. A seam is selected to stitch the first image to the second image based upon the cost for the seam path for that seam being less than a cost for all other computed seam paths, that seam is maintained as the selected seam for stitching based upon a predefined criteria.

18 Claims, 7 Drawing Sheets

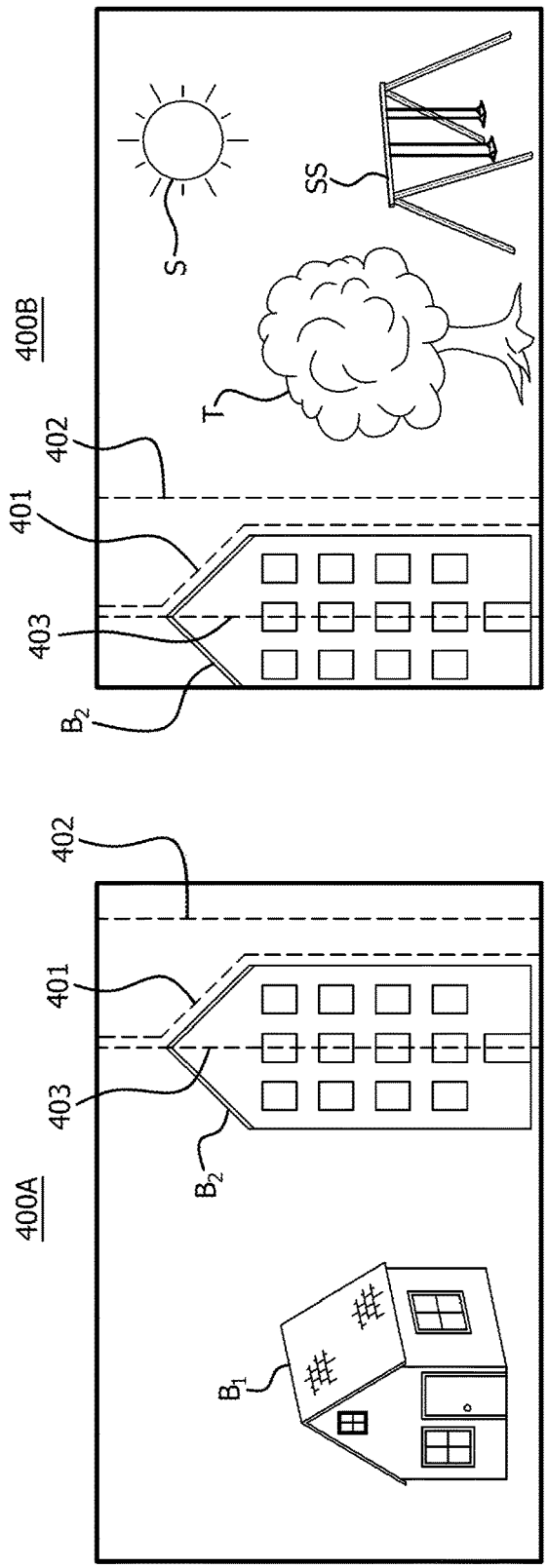

METHOD AND APPARATUS OF SEAM FINDING

BACKGROUND

Virtual reality (VR) has introduced a new level of entertainment experience for users of video games and those who desire an enhanced video or graphic experience. Where once, an individual gamer or viewer would view only a flat screen image, VR allows a 360 degree view immersive experience that allows the viewer or gamer to see completely around, and above and below his or her position.

In order to accomplish this, cameras are utilized to take images and/or video in multiple directions from a common point to capture multiple views that an observer in that position would see depending on the direction he or she is facing. Often, multiple cameras are disposed on a camera rig to capture images and/or video from the individual cameras perspective. Those images or video captured in those views are then stitched together by software to create a virtual 360 degree view around the observer. In order to stitch the images together, a seam is found in an area that overlaps adjacent images taken from adjacent cameras to stitch the images together.

Conventional stitching software exists to find seams, but operates in such a manner that does not lend to high speed, or real time seam finding.

BRIEF DESCRIPTION OF THE DRAWINGS

A more detailed understanding can be had from the following description, given by way of example in conjunction with the accompanying drawings wherein:

FIG. 4A is an example first image captured from a first device of the camera rig depicted in FIG. 1;

FIG. 4B is an example second image captured from a second device adjacent to the first device of the camera rig depicted in FIG. 1;

DETAILED DESCRIPTION

During the capturing of 360 degree image views by a camera for rendering in a virtual reality (VR) environment, there are several operations that are performed in order to properly render the image. For example, correction for lens distortion, adjusting image contrast, seam finding, blending across seams, and blending across lenses is performed. There are conventional techniques for performing each of the aforementioned operations, and therefore the specifics of each operation are not described in further detail. However, described in more detail below is a method and apparatus for performing the operation of seam finding between two adjacent images.

A method of seam finding is disclosed. The method includes determining an overlap area between a first image and a second image. The first image is captured by a first image capturing device and the second image is captured by a second image capturing device. A plurality of seam paths for stitching the first image with the second image is computed and a cost is computed for each seam path. A seam is selected to stitch the first image to the second image based upon the cost for the seam path for that seam being less than a cost for all other computed seam paths, that seam is maintained as the selected seam for stitching based upon a predefined criteria.

An apparatus is disclosed. The apparatus includes a computing device in communication with one or more image capturing devices. The computing device receives first image data captured by a first image device and second image data captured by a second image device. The computing device determines an overlap area between the first image and the second image, computes a plurality of seam paths for stitching the first image with the second image, computes a cost for each seam path, selects a seam to stitch the first image to the second image based upon the cost for the seam path for that seam being less than a cost for all other computed seam paths, and maintains that seam as the selected seam for stitching based upon a predefined criteria.

A non-transitory computer-readable medium having instructions recorded thereon, that when executed by a computing device, cause the computing device to perform operations is disclosed. The instructions include determining an overlap area between a first image and a second image. The first image is captured by a first image capturing device, and the second image is captured by a second image capturing device. A plurality of seam paths for stitching the first image with the second image and a cost for each seam path are computed. A seam is selected to stitch the first image to the second image based upon the cost for the seam path for that seam being less than a cost for all other computed seam paths. That selected seam is maintained as the selected seam for stitching based upon predefined criteria.

Figure 1:
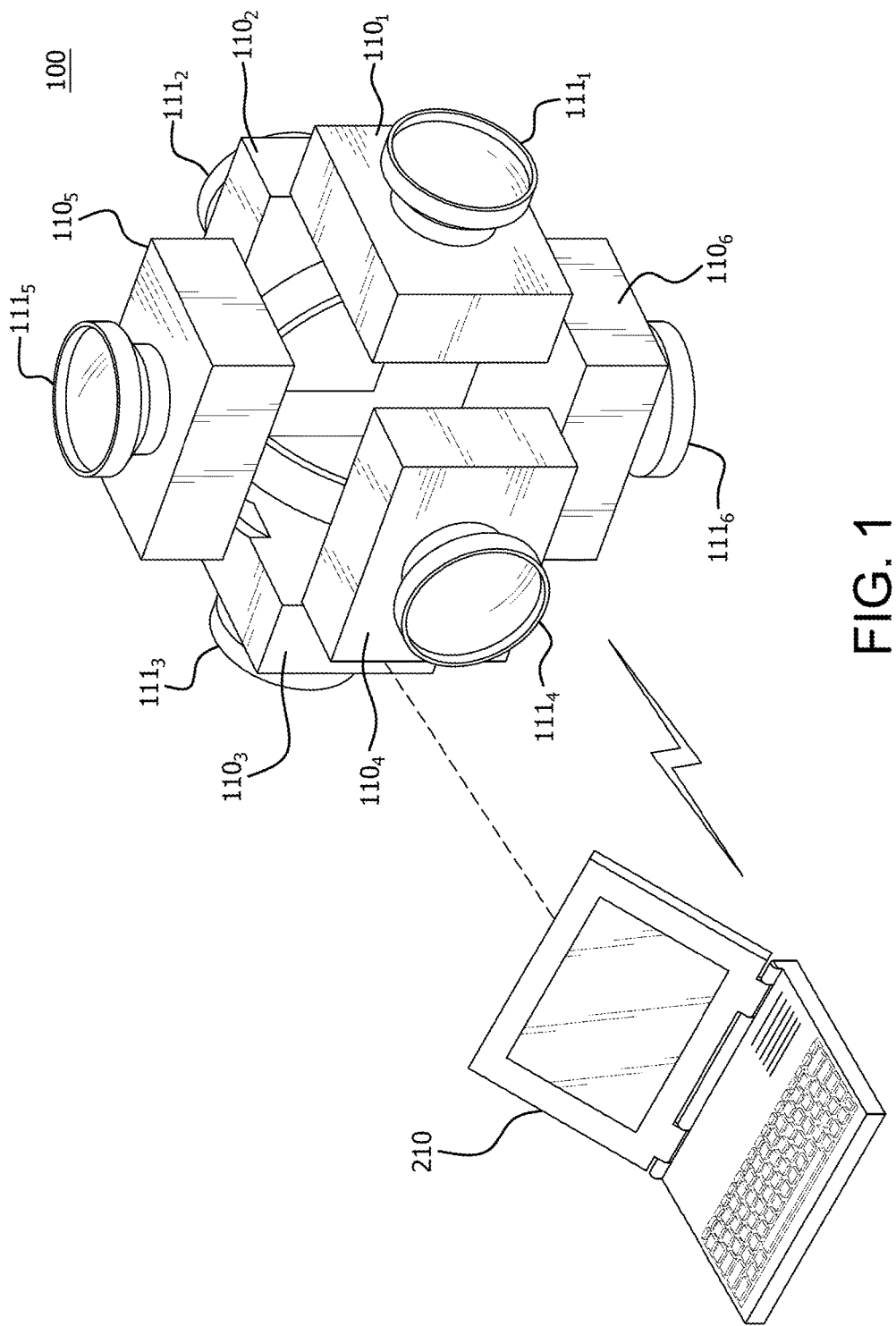
FIG. 1 is a diagram of an example 360 degree camera rig for capturing images and/or video.

FIG. 1 is a diagram of an example 360 degree camera rig 100 for capturing images and/or video. The camera rig 100 includes a plurality of devices 110, (e.g., image capturing devices such as cameras), for capturing the images/video, (designated $110_1$, $110_2$, $110_3$, $110_4$, $110_5$, and $110_6$). Although the components of each device 110 are described in further detail below, it is noted in FIG. 1 that each device 110 includes a respective lens 111, (designated $111_1$, $111_2$, $111_3$, $111_4$, $111_5$, and $111_6$). As shown in FIG. 1, each device 110 has its respective lens 111 pointed in a direction different from the lenses 111 from other devices 110 on the camera rig 100. That is, devices $110_1$-$110_4$ are situated substantially planar to one another and each face a direction substantially 90 degrees from one another. Device $110_5$ is pointed in a perpendicular direction, (e.g., up), with relation to the devices $110_1$-$110_4$ and device $110_6$ is pointed in an opposite direction, (e.g., down), with relation to device $110_5$. Accordingly, the six devices $110_1$-$110_6$ are situated around the camera rig 100 to capture images or video in substantially a 360 degree field of view. Although six devices 110 are shown in FIG. 1, it is noted that more or less devices 110 can be utilized on the camera rig 100. Also shown in FIG. 1 is a computing device, or system, 210 in communication with each of the devices 110 of the camera rig 100 as will be described in further detail below. The communication can be wired or wireless, as depicted.

Figure 2A:
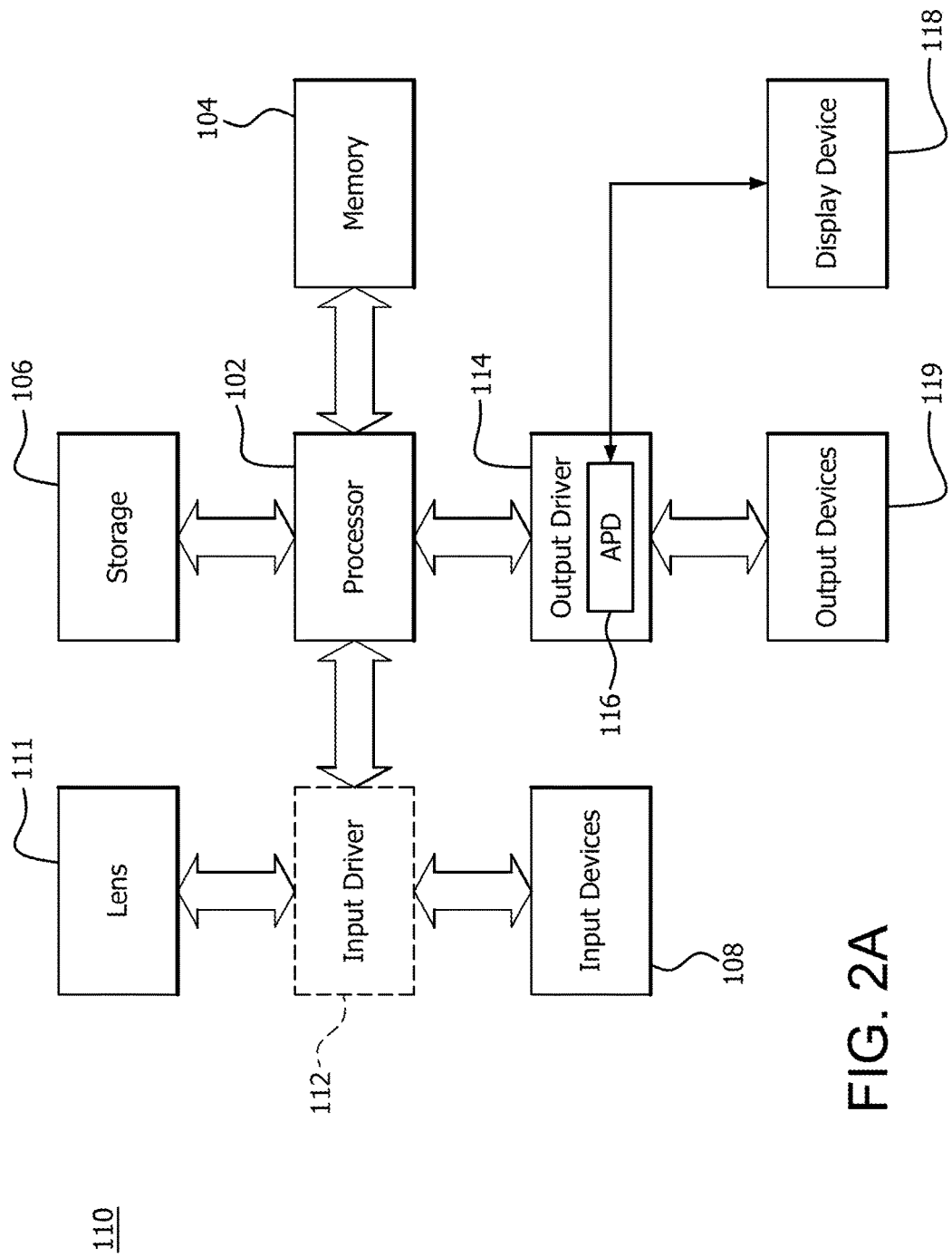
FIG. 2A is a block diagram of an example device depicted in FIG. 1 in which one or more features of the disclosure can be implemented.

FIG. 2A is a block diagram of one of the example devices 110 depicted in FIG. 1 in which one or more features of the disclosure can be implemented. More detail regarding the implementation of a method of seam finding as it relates to FIG. 2 is described in further detail below. Although the device 110 has been described as an image capturing device, (e.g., camera), it is noted that the device 110 can include, for example, a computer, a gaming device, a handheld device, a set-top box, a television, a mobile phone, or a tablet computer. For purposes of example herein, the example device 110 is described as an image capturing device 110, which for example is a camera.

Accordingly, the device 110 includes a processor 102, a memory 104, a storage 106, one or more input devices 108, a lens 111, and one or more output devices 119. The device 110 can also optionally include an input driver 112 and an output driver 114. It is understood that the device 110 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is be located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 119 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 the input devices 108, and the lens 111, and permits the processor 102 to receive input from the input devices 108 and the lens 111. The output driver 114 communicates with the processor 102 and the output devices 110, and permits the processor 102 to send output to the output devices 119. It is noted that the input driver 112 and the output driver 114 are optional components, and that the device 110 will operate in the same manner if the input driver 112 and the output driver 114 are not present. The output driver 114 includes an accelerated processing device ("APD") 116 which is coupled to a display device 118. The APD is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2B:
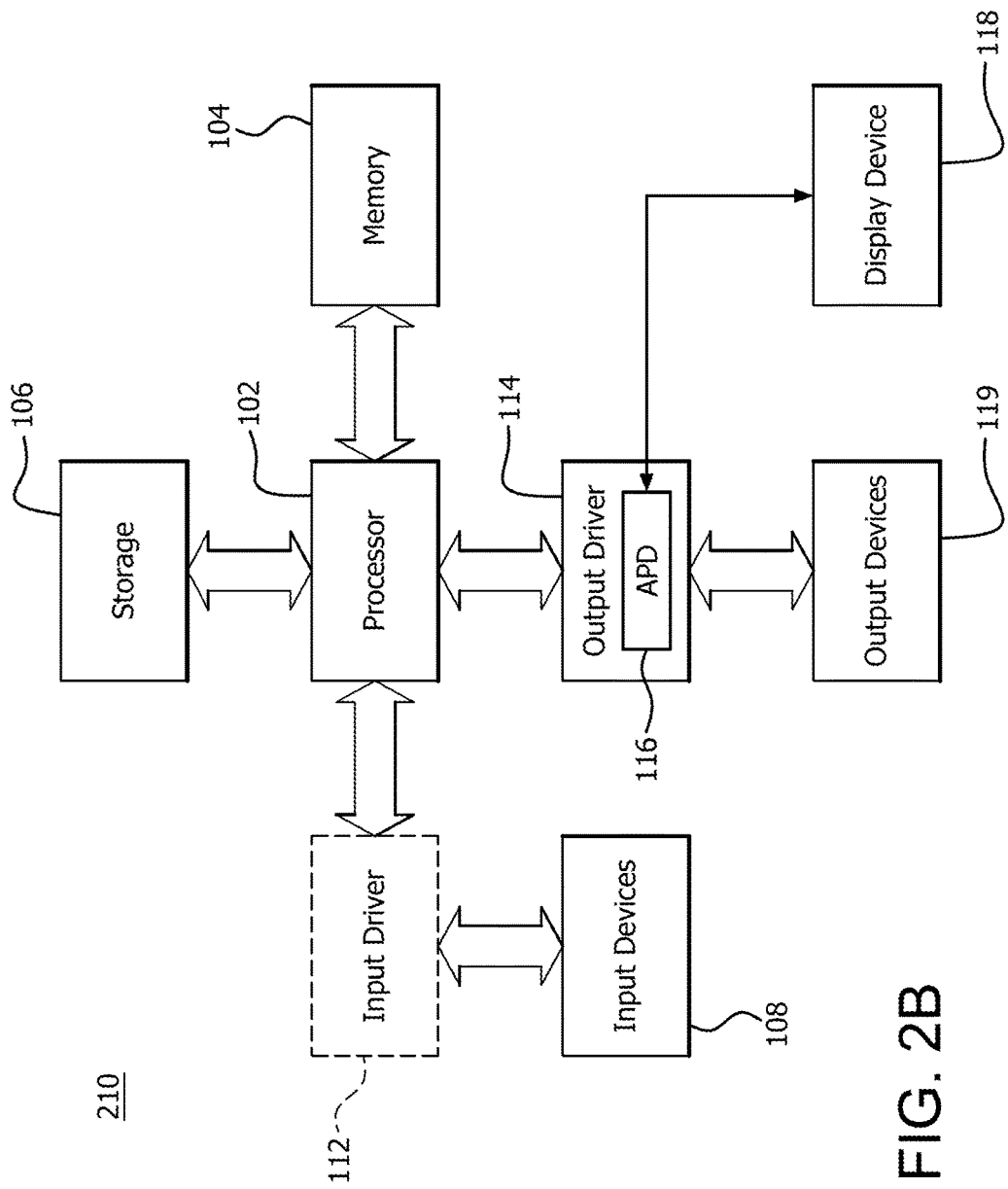
FIG. 2B is a block diagram of an example system in which one or more features of the disclosure can be implemented.

FIG. 2B is a block diagram of an example system 210 in which one or more features of the disclosure can be implemented. The system 210 includes substantially similar components to the device 110, except for the lens 111. The system 210 can include can include, for example, a computer, a gaming device, a handheld device, a set-top box, a television, a mobile phone, or a tablet computer. The system 210 is in communication with each of the devices 110 depicted in FIG. 1 and can provide control programming to the devices 110 and receive data from the devices 110.

Figure 3:
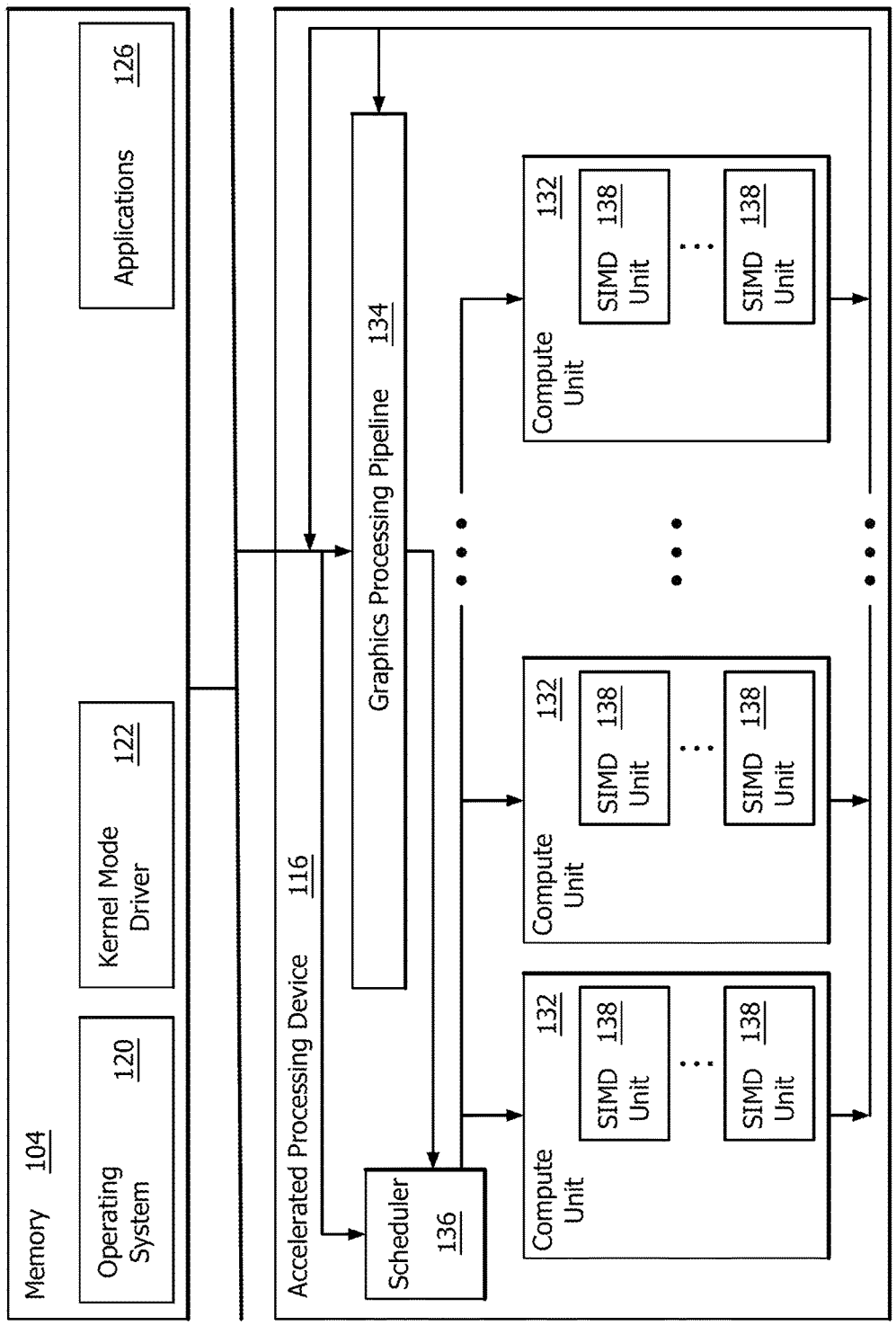
FIG. 3 is a block diagram of the example device of FIG. 2A and example system of FIG. 2B, illustrating additional detail.

FIG. 3 is a block diagram of the device 110 and system 210, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 is configured to perform operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 4C:
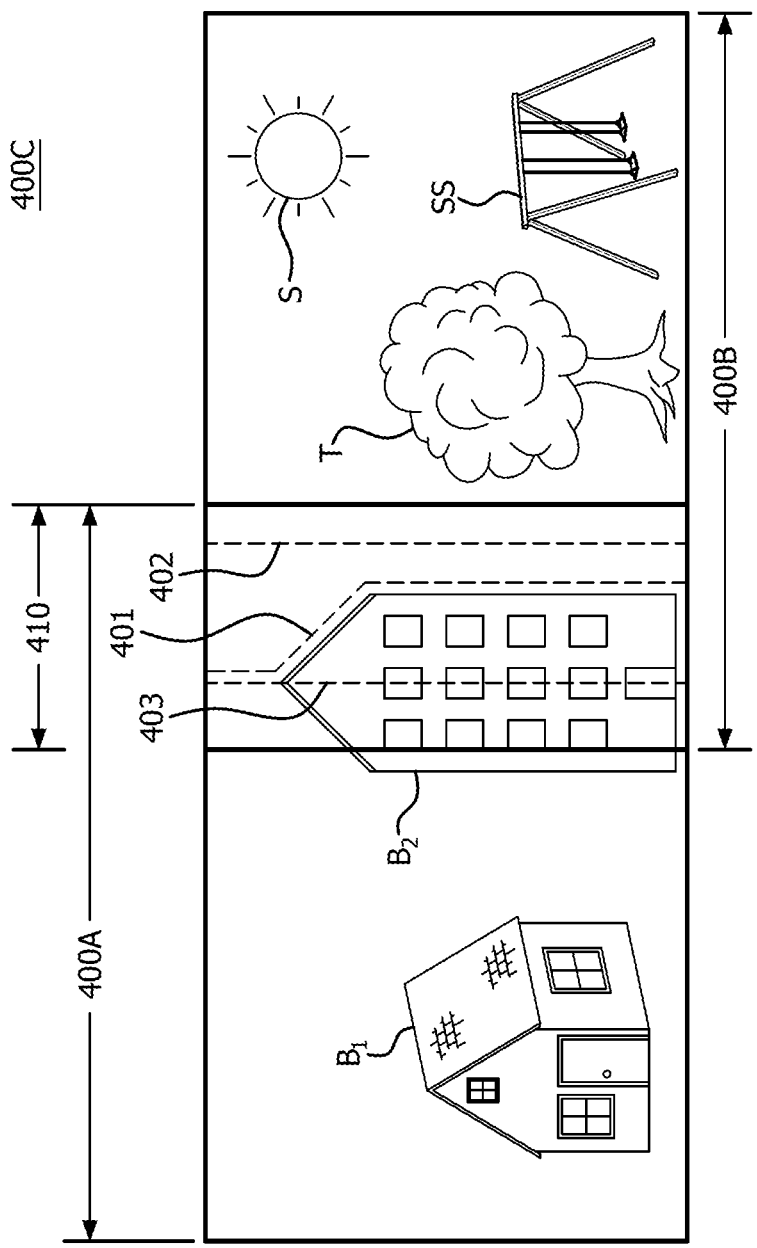
FIG. 4C is an example combined image of the first and second images.

As mentioned above, each of the devices 110 captures an image in a different direction in accordance with its associated lens 111. Accordingly, device $110_1$ captures a different image from device $110_2$, and so on. However, between adjacent devices 110, there is an overlap between images captured. That is, the image captured by device $110_1$ includes an area of overlap with the image captured by devices $110_2$-$110_6$. For example, referring now to FIG. 4A, an example first image 400A captured from a first device, (e.g., $110_1$), of the camera rig depicted in FIG. 1 is shown. The image 400A includes a number of example objects in the field of view of the lens $111_1$, which are captured in image 400A. For example, image 400A depicts a building B1 and building B2 in the field of view captured by lens $111_1$. A plurality of seams 401, 402 and 403, which are described in further detail in the method described below are also shown in image 400A. Briefly, however, the seams 401, 402 and 403 are paths where the image 400A can be cut for stitching, (i.e., combined), together with an adjacent image, and are in an area of overlap (described below) between two adjacent images. A method for finding a particular seam to perform the stitching from seam paths 401, 402 and 403 is described below. Also, as shown in FIGS. 4A, 4B and 4C, the seams are depicted as fairly linear, or having only minor changes in direction at various points. These example seams are for the purpose of describing the features below. However, it should be noted that the seams can take any path from one end of the seam to the opposite end of the seam.

FIG. 4B is an example second image 400B captured from a second device adjacent to the first device 110 of the camera rig depicted in FIG. 1. Using the example depicted in FIG. 4A, where the first device is device $110_1$, and the second device 110 is device $110_4$. That is, the image 400B is an example image that is captured by the lens $111_4$ of device $110_4$ that is adjacent and to the right of device $110_1$. As shown in FIG. 4B, image 400B includes a number of objects captured by the lens $111_4$, such as the building B2, a tree T, the sun S, and a swingset SS. Also shown in the image 400B are the plurality of seams 401, 402 and 403.

As can be seen in FIGS. 4A and 4B, there is a section of overlap between images 400A and 400B, generated by the overlap in the viewing area that can be captured by lens $111_1$ of device $110_1$ and lens $111_4$ of device $110_4$. Accordingly, FIG. 4C is an example combined image 400C of the first image 400A and second image 400B. As can be seen in FIG. 4C, an area of overlap 410 exists between the two images. It is noted that the area of overlap 410 in the present example is an overlap along the right edge of image 400A and the left edge of image 400B. That is, the overlap area proceeds from what can be described as the "top" of each image to what can be described as the "bottom" of each image. However, the area of overlap could be along any edge, such as the top or bottom edges of the images, such as if the adjacent image to either images 400A or 400B is an image captured by one of the devices $110_5$ or $110_6$. In that case, the areas of overlap would run along either the top or bottom edges of images 400A or 400B, and proceed from what can be described as the "left" edge of each image to the "right" side of each image.

Referring again to FIG. 4C, however, as can be seen in the overlap area 410, the building B2 is shown as a common object that is in both image 400A and 400B. In order to determine where to stitch together image 400A and image 400B to generate the combined image 400C, a seam is found, or determined, where to cut each image. Once the seam is found, image 400A and 400B are stitched together along that seam that is found/determined to generate the combined image 400C. That is, in one example, the processor 102 of the device 110 or the system 210 can utilize a stitching algorithm, (e.g., a conventional stitching algorithm), to combine image 400A and 400B into combined image 400C by stitching them together once the seam is found in accordance with the method described below. Additionally, the stitching algorithm can be performed by the APD 116 of the system 210, or a combination of any of the processors 102 and APD 116, depending on the choice of a programmer.

Figure 5:
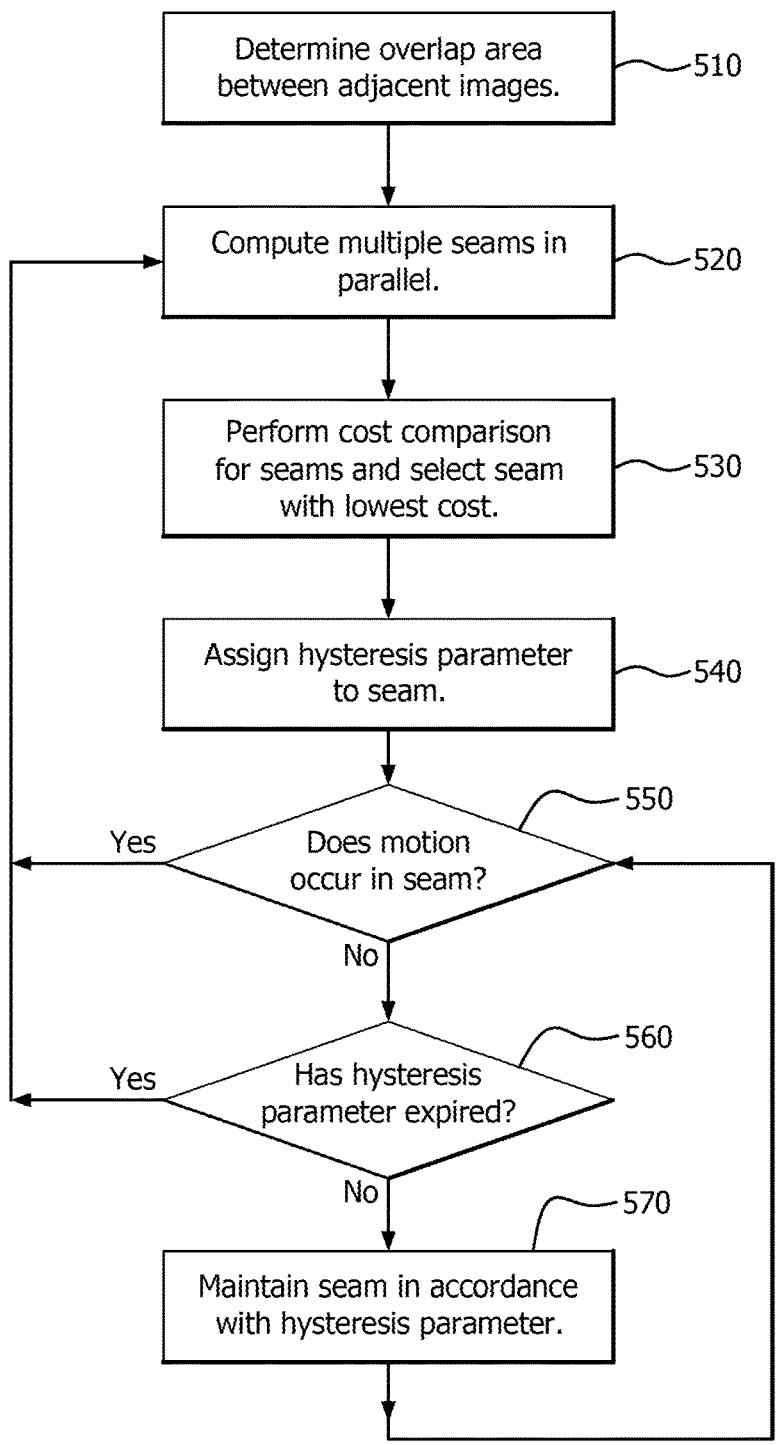
FIG. 5 is a flow diagram of an example method of seam finding.

FIG. 5 is a flow diagram of an example method 500 of seam finding. Effectively, when stitching together two images such as image 400A and 400B, any common pixel in the overlap area 410 from images 400A and 400B can be utilized as the boundary between each image. It is desirable to select, however, pixels for the seam in a way that creates a fewest numbers of artifacts, (e.g., abnormalities), and is least obvious to detection by the human eye. That is, although a seam exists between two adjacent images, it is desirable that the image appear to the human eye to be seamless in order to enhance the experience of the viewer.

Accordingly, in step 510, the overlap area between two adjacent images is determined. It should be noted that the overlap area, or a subset thereof, can be determined during a precomputing step, which is a phase that can be performed prior to any video or image capturing or processing by any of the devices 110, and can be performed by the processor 102 or the APD 116 of either FIG. 2A or FIG. 2B. Referring back to FIG. 4C, the overlap area in image 400C is shown as the area designated 410. Once the overlap area is determined, multiple seams are computed in parallel (step 520).

That is, with regard to step 520, beginning at a pixel at one edge of the overlap area, for example at the top of the overlap area 410 of images 400A and 400B, and proceeding pixel by pixel along a path to the opposite end of the overlap area, such as to the bottom of the overlap area 410 of images 400A and 400B a seam is computed. Three example seams are shown as being computed in image 400C, (i.e., seam path 401, 402 and 403). However, it is noted that any number of seams can be computed and the use of three seams is for example purposes. Indeed, every pixel to pixel path from every pixel at the top of the overlap area 410 to every pixel at the bottom of the overlap area 410 can be computed as a seam. Conventional seam computation techniques perform this computation serially, (i.e., each seam path is computed one after the other, where the second seam is not computed until after the first seam path computation is complete, and so on).

However, in step 520, multiple seams are computed in parallel by utilizing the parallelism inherent in, for example, the APD 116 of the system 210. That is, the processor 102 receives the image data including the overlap area 410 and utilizes the APD 116 to compute in parallel the seam paths on compute units 132 in parallel. In the example shown in FIG. 4C, seam paths 401, 402 and 403 are then computed in parallel on separate compute units 132 and the results returned to the processor 102 for further processing. Again, for purposes of example, only three seam paths out of many are depicted as being computed.

As part of computing the multiple seams in parallel, as each path is determined/found, a cost for applying the seam along that path is computed. The costs are computed for every possible pixel in the determined overlap area or subset thereof, for each frame at the start of the seam finding method. That is, each path can be assigned a cost based upon a certain set of criteria, described below. As mentioned above, some seams may be more detectable to the human eye than others. Accordingly, those seams are assigned a higher cost than a less detectable seam, where a cost for each seam is assigned a value between 0 and 1. Therefore, in order to compute the cost for each seam, a cost is determined pixel by pixel for every seam path in accordance with predefined criteria.

One example criteria for cost is whether or not an object edge exists in the pixel that is parallel to the direction that the seam is proceeding across the image. If there is a parallel edge, then a lower cost is assigned to that pixel, (e.g., a 0). Conversely, if a perpendicular edge to the direction the seam is proceeding exists in that pixel, than a higher cost is assigned to that pixel, (e.g., a 1). Another cost consideration occurs where the pixel being examined does not include an object edge. In this case the cost can be determined based upon whether a neighboring pixel to the pixel being examined includes an object edge. For example, if the pixel examined does not have an edge, but a neighboring pixel has an edge, the examined pixel is assigned a higher cost, (e.g., 0.75), than if a neighboring pixel does not have an object edge, (e.g., 0.25).

For example, referring again to FIG. 4C, there are shown three example seams (401, 402 and 403). Seam 401 proceeds from a pixel at the top edge of the overlap area 410 and proceeds downward to the roof of building B2, where it follows the roof and then the right edge of building B2. Seam 402 begins at a pixel to the right of building B2 and proceeds effectively to the bottom of the image in FIG. 4C in effectively empty space, (e.g., blue sky). Seam 403 begins approximately at a pixel near the top pixel for seam 401 and proceeds generally directly straight through the building B2.

Analyzing the cost for seam 401 from pixel to pixel, it can be seen that a large number of pixels include a parallel edge of building B2 and angular edges for the roof of building B2. Seam 402 includes a significant amount of pixels that do not have an edge, but also are not neighboring to pixels that have edges. Seam 403 includes a combination of pixels that do not have parallel edges, but have pixels that have perpendicular edges, (e.g., the pixels that include the tops and bottom of the windows depicted in building B2).

Once all of the costs are computed, they are accumulated per seam and a cost comparison is performed for all of the seams with the seam having the lowest cost being selected (step 530). For example, referring again to FIG. 4C, it can be determined that seam 401 includes a lower cost than seam 402, which in turn incurs a lower cost than seam 403. It is likely less noticeable to the human eye to detect seam 401 as it substantially parallels an object edge, (i.e., B2), which is less noticeable than seam 402, where differences in the image capture between image 400A and 400B are more noticeable in the "blue sky" area. Additionally, seam 403 can be even more noticeable to the human eye as distortions and image differences occur at significant stitch points between image 400A and 400B, (e.g., the window tops and bottoms). Therefore, in step 530, seam 401 is selected.

Once the seam is selected in step 530, it can be desirable to maintain that seam without shifting the seam to another seam for a predefined period to avoid flicker in the image as the seam is being switched. Accordingly, in step 540, a hysteresis parameter is assigned to the selected seam. The hysteresis parameter includes assigning a value to the seam that allows it to be maintained as the selected seam for stitching for a predetermined number of image frame captures.

However, during the period that the selected seam is being utilized as the seam to stitch the two images together, an event can occur that makes the seam less optimal, such as if an object moves across the seam. In step 550, therefore, it is determined whether motion occurs in the seam. For example, referring again back to FIG. 4C where seam 401 is selected as the seam, if a person were to exit building B2 and walk around in the vicinity of seam 401, seam 401 would become more noticeable to the human eye because of the motion in it. Accordingly, if there is motion detected in the seam in step 550, then the method proceeds back to step 520 to compute seams again for selection in the stitching process.

If there is no motion in the seam (step 550), then the method proceeds to step 560, where it is determined whether or not the hysteresis parameter is expired. That is, if the number of predetermined image frame captures to maintain the seam have passed. If the hysteresis parameter has not expired, the method proceeds to step 570 where the seam is maintained in accordance with the hysteresis parameter, looping back to step 550. However, if the hysteresis parameter has expired, the method proceeds back to step 520. Also, even if the hysteresis parameter has expired, unless there is a cost advantage that exceeds a threshold for another seam, the current selected seam is maintained as the seam.

It should be understood that many variations are possible based on the disclosure herein. Although features and elements are described above in particular combinations, each feature or element can be used alone without the other features and elements or in various combinations with or without other features and elements.

For example, since image data is being captured by the lenses in realtime for storage or display, in order to maintain real time performance, the computation of all the seams for stitching between images can be staggered. That is, the computation is not performed for every seam during every frame capture. For example, a first seam, (such as the seam between images 400A and 400B), is computed during the capture of frame 1. Then, some predefined number of frames later, a second seam, such as the one that might be utilized to stitch image 400A to the image captured by device $110_2$, is computed. Accordingly, the seam computation is not being performed during every frame capture.

Additionally, the computation can be prioritized. That is, a device that is capturing an image that might be considered more important can have its seam computation prioritized above the computation of seams between other devices 110. For example, if device $110_1$ is the "front" of the camera rig 100, then it is possible that a user would be more focused on something appearing in the image captured by that device, (e.g., image 400A), and adjacent images. Therefore, seam computation for images adjacent to image 400A can be prioritized for computation over images that are not adjacent to image 400A, for example. In the example shown in FIG. 1, this can translate to seams of images captured by the lenses 111 of devices $110_2$, $110_4$, $110_5$ and $110_6$ that are adjacent to device $110_1$.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method of performing improved seam finding that reduces a number of computations required by a processor to find a seam, the method comprising:
    capturing a first image by a first image capturing device;
    capturing a second image by a second image capturing device;
    receiving, by the processor, the first image and the second image;
    determining, by the processor, an overlap area between the first image and the second image;
    computing, by the processor, a plurality of seam paths for stitching the first image with the second image;
    computing, by the processor, a cost for each seam path;
    selecting, by the processor, a seam to stitch the first image to the second image based upon the cost for the seam path for that seam being less than a cost for all other computed seam paths; and
    maintaining, by the processor, that seam as the selected seam for stitching a predefined number of frame captures unless an event is detected thereby reducing the number of required computations to find the seam.

2. The method of claim 1 wherein the determining an overlap area is performed prior to capturing the first image and the second image.

3. The method of claim 1 wherein the plurality of seam paths are computed in a subset area of the overlap area.

4. The method of claim 1 wherein the computing each seam path of the plurality of seam paths includes computing a path from a first pixel at a first edge of the overlap area to a last pixel at a second edge of the overlap area via intervening pixels between the first pixel to the last pixel.

5. The method of claim 4 wherein the seam path is computed by traversing neighboring pixel to neighboring pixel from the first pixel to the last pixel.

6. The method of claim 1 wherein computing a cost for each seam path includes computing a cost for each pixel based upon a predetermined criteria.

7. The method of claim 6 wherein a lower cost is assigned to a pixel having a first predetermined criteria and a higher cost is assigned to a pixel having a second criteria.

8. The method of claim 7 wherein the cost for a given seam path is computed by adding the assigned costs for each pixel in that seam path.

9. The method of claim 1, further comprising recomputing, by the processor, the multiple seams in parallel upon the detection of the event.

10. The method of claim 1 wherein the detected event is motion in the seam.

11. An apparatus for performing improved seam finding that reduces a number of computations required to find a seam, comprising:
    a processor in communication with one or more image capturing devices, wherein the processor receives first image data captured by a first image device and second image data captured by a second image device, the processor determines an overlap area between the first image and the second image, computes a plurality of seam paths for stitching the first image with the second image, computes a cost for each seam path, selects a seam to stitch the first image to the second image based upon the cost for the seam path for that seam being less than a cost for all other computed seam paths, and maintains that seam as the selected seam for stitching a predefined number of frame captures unless an event is detected thereby reducing the number of required computations to find the seam.

12. The apparatus of claim 11 wherein the processor computes each seam path of the plurality of seam paths by computing a path from a first pixel at a first edge of the overlap area to a last pixel at a second edge of the overlap area via intervening pixels between the first pixel to the last pixel.

13. The apparatus of claim 11 wherein the processor computes the cost for each seam path by computing a cost for each pixel based upon a predetermined criteria.

14. The apparatus of claim 13 wherein a lower cost is assigned to a pixel having a first predetermined criteria and a higher cost is assigned to a pixel having a second criteria.

15. The apparatus of claim 14 wherein the cost for a given seam path is computed by adding the assigned costs for each pixel in that seam path.

16. The apparatus of claim 11 wherein the processor recomputes the multiple seams in parallel upon the detection of the event.

17. The apparatus of claim 11 wherein the detected event is motion in the seam.

18. A non-transitory computer-readable medium for performing improved seam finding that reduces a number of computations required by a processor to find a seam, the non-transitory computer-readable medium having instructions recorded thereon, that when executed by the processor, cause the processor to perform operations including:

receiving first image data captured by a first image capturing device and second image data captured by a second image capturing device;

determining an overlap area between the first image and the second image;

computing a plurality of seam paths for stitching the first image with the second image;

computing a cost for each seam path;

selecting a seam to stitch the first image to the second image based upon the cost for the seam path for that seam being less than a cost for all other computed seam paths; and maintaining that seam as the selected seam for stitching a predefined number of frame captures unless an event is detected thereby reducing the number of required computations to find the seam.

* * * * *